Patented July 10, 1934

1,966,094

UNITED STATES PATENT OFFICE 1,966,094

COLD MOLDED ARTICLE AND PROCESS OF PRODUCING SAME

Clarence A. Herbst, Chicago, Ill., assignor to Economy Fuse & Manufacturing Company, Chicago, Ill., a corporation of New York No Drawing. Application July 17, 1929, Serial No. 379,074. Renewed October 20, 1932

13 Claims. (Cl. 106—31)

This invention relates to a novel process of producing a composition of matter adapted for cold molding and to the improved molded articles produced by said process.

An object of this invention is to provide a process, the practice of which results in the production of improved molded articles, particularly characterized for their smooth, shiny, nice appearing finish and their sharp, clean cut, defining edges and further for their easy removability from the dies without tendency to stick or adhere to the mold surface.

A further object of this invention is to provide molded articles of the above described type which possess the additional advantageous property of having a greater specific gravity which makes for greater dielectric strength, and as far as the applicant is aware, the improved finish and good appearance above referred to.

A further object of this invention is to provide a novel process by which the improved articles may be made, which process is highly efficient, relatively cheap in practice, and is one by which highly successful results may be obtained without requiring the exercise of an unusual degree of skill.

Various other opjects not specifically enumerated are contemplated for this invention and these will readily appear to one skilled in the art as the following description of one illustrative embodiment of the invention proceeds.

Heretofore, articles of commercial value and utility have been produced by processes including a cold molding operation and it is known that articles of this type may be produced by employing solutions of certain known solid binding materials and suitable filling materials admixed therewith which mixtures are subsequently molded to shape and finally heat treated in a manner to render them hard and infusible in their final form.

The usual practice prior to this invention has been to select the desired solid binding material which may be either an asphalt, stearine pitch, natural gums, synthetic and natural resins or other similar substances subject to cold molding operations, and to produce with the substance so selected, a solution by employing a solvent therefor which may be selected according to its properties, its price or other factors bearing on the success of a commercial process.

Solutions so formed are then mixed with the desired quantity of a suitable filling material while the entire mixture is subjected to elevated temperatures for the purpose of maintaining the mix in a relative fluid condition to enhance the intimate mixture of the components. The mixed mass is then subjected to a cooling process during which time a large portion of the solvent which has not already escaped during the mixing operation, passes off and after which the mass is disintegrated in a suitable disintegrator.

The mix in this form, is then molded and subsequently heat treated. In those instances where the molded articles displayed a tendency to stick to the molds it is customary to introduce, just prior to the molding operation, a suitable agent to serve as a lubricant.

Whereas the known processes have been practiced with varying degrees of success, the applicant has found that superior articles can be produced, namely those having a higher dielectric strength and a smoother, cleaner cut and more finished appearance, when steps are taken during the mixing operation, to produce a higher degree of impregnation of the filling material with the binding material. Accordingly, the applicant has discovered that if a substantial part of the mixing operation is conducted upon the mass or mixture while it is in a relatively non-plastic condition, that is, to a considerable degree, less fluid than in processes heretofore practiced, that the higher mechanical force exerted upon the mass in the accomplishment of the mixing operation produces a high degree of impregnation making for the greater specific gravity and tenacity characterizing the improved articles above referred to.

It is readily conceivable that this relatively non-plastic condition may be produced by various methods, as it is well known that the fluidity of the mixture at this time, is based upon two factors, namely, that of the thermo-plastic property of the binding materials employed and also of the dissolving effect of the solvent employed.

It is recognized however, that in order to commence the mixing operation, that the components must be brought together while the solution of binding material is in a relatively fluid condition as this is required to produce a uniform distribution of one into the other.

Consequently, in practicing the present invention, it is desirable to affect the initial admixture while the mass remains relatively fluid or highly plastic, but, after thorough admixture is obtained, it is desirable to cause the mixture to become, as rapidly as possible, very much more viscous or relatively non-plastic in consistency.

It is conceivable that this may be accomplished by different methods, as for instance, the mass may be rapidly cooled, so that the binder will stiffen and tend to produce the desired non-plastic condition or, by the employment of additional agents or agent, together with the application of heat, the solvent may be expelled so as to produce the desired non-plastic condition, even though the thermo-plastic property of the binding material causes it to remain in a less viscous condition under the exposure of the elevated temperatures. Of course, it is to be understood that the production of the relatively non-plastic mass, as above outlined, by expelling the solvent, has its maximum effect only when those solid binders are used which have a high melting point, or in other words, those which are substantially uneffected as to viscosity within the variation of room temperature. Therefore, the selection of the particular method to be employed for producing the relatively non-plastic mass will be based upon to some extent, the type of binding material used.

Although the present invention contemplates any and all methods for practicing the above outlined invention, in view of the desirability of including a lubricant in the mixing composition, the applicant has found that an agent may be employed with a high degree of success, which agent is termed in this specification, an impregnating agent. The impregnating agent may be introduced at the commencement of the mixing operation and it is found, that it serves in the mixture, to speed up the evaporation of the solvent whereby the desired relatively non-plastic condition is produced.

This method is preferred in cases where the binding material has a melting point sufficiently high to provide the necessary thickening upon the loss of a substantial portion of the solvent.

Materials which are capable of serving as impregnating agents, it is found, must possess certain properties with relation to the solvent and the binding material. These properties are, that the impregnating agent must be of a higher boiling point than the solvent selected and must be insoluble and immiscible in the particular solvent employed and furthermore, the impregnating agent must be incapable of dissolving the solid binding material.

When such agents are employed, the temperature of the mass during the mixing operation is maintained substantially within the range between the boiling point of the solvent and the boiling point of the impregnating agent. These agents as far as the applicant knows, must be liquids and whereas they may be introduced in various ways, it is preferable that they be introduced as a last step during the mixing operation.

Although it is conceivable that a high degree of success may be obtained when the quantity of the impregnating agent varies, the applicant has found that the best results are obtained when the quantity thereof is approximately four and one-half per cent by weight, of the entire mass, that is, including the solid binding material, solvent and filling material.

Although the applicant does not fully understand the exact theory underlying the behavior of the impregnating agent, so employed, it is known that the presence of such agents selected with the properties according to the plan above outlined, cause, during the heating and mixing operation, a large portion of the solvent to be expelled in a surprisingly short period of time, whereby the mass is rapidly brought to a relatively non-plastic condition.

As the mixing operation is continued, with the mass in this condition, a high degree of impregnation results. Apparently, some of the impregnating agent passes out of the mixture at this time or at some time prior to the final heat treating or baking process.

However, a sufficient quantity of this impregnating agent stays in which also serves as a lubricant during the molding operation which enables the very condensed, nice appearing articles to be readily removed from the mold without difficulty.

Knowing now that the solvent and the impregnating agent need only be selected according to their relative properties as above outlined, it will be readily understood that the applicant is not limited to any particular solvents or agents but that the solvent may be selected according to commercial feasibility in the same manner as that of prior processes.

In order to illustrate how the invention may be practiced, one specific embodiment of the invention will now be given. Together with this embodiment, other groups of solvents and impregnating agents to be used therewith, will also be given.

Good products, it is found, are obtained when a solid binding material such as asphalt, has mixed therewith, approximately twenty per cent, by weight, of a polymerizing oil and a solution thereof is formed by dissolving the mixture in approximately thirty per cent, by weight, of mineral solvent. The solvent, for the purpose of this illustration, should have a boiling range of from 93 to 148 degrees C. The solution so formed, is of a syrupy consistency. Next, approximately four parts of a suitable filling material, such as for instance, asbestos fibre, are introduced in a steam jacketed mixer. The quantity of filling material is calculated on the basis of the entire solution constituting one part. Next, the solution is introduced and the entire mass mixed while the mixer is heated by steam whereby to maintain the metal surface of the mixer at approximately two hundred and twelve degrees F.

During the mixing operation, about four and one-half per cent, by weight, calculated on the entire mass, of furfural is introduced. The mixing operation is continued for approximately thirty minutes. During the mixing operation, it is noted that a considerable portion of the solvent passes off and the mass thickens and becomes relatively non-plastic whereby during the latter portion of the mixing period, a high mechanical force is exerted against the mass in accomplishing the mixing operation. It is at this time and by this operation that the high degree of impregnation is affected.

After the mixing operation, the mass is removed from the mixer and is cooled to room temperature after which it is placed in a disintegrator of such construction and kind that it will bring it to a relatively fine comminuted state.

In this form, the composition is suitable for cold molding and it is found to contain some of the impregnating agent which in addition is adapted to serve as a lubricant in the molding operation.

The material is then molded to form the desired articles, which articles are removed from the mold and subsequently heat treated or baked. This heating operation is accomplished in accordance with known practice, the heat period varying somewhat according to the shape and size of the article being heat treated.

It is obvious that the present invention is applicable to any of the solid binding materials which will serve for cold molding purposes and the applicant does not wish to be limited to any particular binding agents nor to the specific example of this disclosure.

Some of the binding agents which have been found to serve well are, asphalts, pitches, gums, resins, etc.

With a mineral solvent having a boiling point range of ninety three degrees to one hundred and forty eight degrees C. good results have been obtained by employing furfural as an impregnating agent.

With the mineral solvent having a boiling point range of between one hundred and fifty degrees C. to one hundred and seventy five degrees C. ethylene glycol may be employed as the impregnating agent.

With the mineral solvent having a boiling point range of between one hundred and fifty degrees and two hundred degrees C. diethylene glycol may be used as the impregnating agent.

With methanol, which has a boiling point of sixty six degrees C. a mineral solvent having a boiling range of one hundred and seventy degrees to five hundred degrees C. may be used as the impregnating agent.

In the above list of possible solvents and corresponding impregnating agents, it will be noted that the governing characteristics in each instance is that the impregnating agent is of a higher boiling point than the solvent and immiscible and insoluble therein. Also the impregnating agent is incapable of dissolving the particular solid binder used.

Whereas the above illustrations will serve by way of example, the present invention is not to be limited in any particular thereby, as the scope of the invention will be determined from an understanding of the illustrations herein given and an appreciation of the advantages which these illustrated forms produce in the art.

The scope of the present invention will be particularly pointed out in the appended claims.

I claim:

1. The process of producing a cold molding composition, which consists in forming a solution of asphalt in a mineral solvent having a boiling point of from ninety three degrees C. to one hundred and forty eight degrees C. mixing the solution so formed with a filling material in the presence of approximately four and five tenths per cent of furfural calculated on the entire mass while maintaining the mixture at a temperature substantially within the range between ninety three degrees C to one hundred and sixty one degrees C.

2. In a process of producing cold molding compositions, the step which comprises mixing a suitable binding material, a solvent for said binding material, a filling material, and an impregnating agent possessing the following characteristics; immiscibility and insolubility with said solvent, incapability of dissolving said binding material, a boiling point higher than the boiling point of said solvent and above one hundred degrees centigrade.

3. The process of producing cold molded articles, which comprises mixing a suitable binding material, a solvent for said binding material, a filling material, and an impregnating agent possessing the following characteristics; immiscibility and insolubility with said solvent, incapability of dissolving said binding materal, a boiling point higher than the boiling point of said solvent and above one hundred degrees centigrade; heating said mixture during the mixing operation and thereafter molding articles from the composition so formed.

4. The process of producing cold molded articles, which comprises mixing a suitable binding material, a solvent for said binding material, a filling material, and an impregnating agent possessing the following characteristics; immiscibility and insolubility with said solvent, incapability of dissolving said binding material, a boiling point higher than the boiling point of said solvent and above one hundred degrees centigrade; heating said mixture during the mixing operation, thereafter molding articles from the composition so formed and finally heat treating said objects.

5. The process of producing cold molding compositions which comprises mixing a suitable binding material, a solvent for said binding material, a filling material, and an impregnating agent possessing the following characteristics; immiscibility and insolubility with said solvent, incapability of dissolving said binding material, a boiling point higher than the boiling point of said solvent and above one hundred degrees centigrade; heating said mixture during the mixing operation and continuing said mixing and heating until a substantial portion of the solvent is eliminated.

6. The process of producing cold molding compositions which comprises mixing a suitable binding material, a solvent for said binding material, a filling material, and an impregnating agent possessing the following characteristics; immiscibility and insolubility with said solvent, incapability of dissolving said binding material, a boiling point higher than the boiling point of said solvent and above one hundred degrees centigrade; and heating said mixture during the mixing operation to maintain a temperature for said mixture between the boiling points of said solvent and said impregnating agent.

7. The process of increasing the degree of impregnation of a filling material with a binding material in a mixing operation for the production of cold molding compositions, which comprises the step of conducting the mixing operation upon a mass of binding material and solvent therefor, in the presence of an impregnating agent having a boiling point higher than the boiling point of said solvent and above one hundred degrees centigrade, immiscibility with and insolubility in said solvent, and incapability of dissolving said binding material.

8. The process of producing a cold molding composition, which consists in forming a solution of a solid binding material insoluble in furfural, in a mineral solvent having a boiling point of from ninety three degrees C. to one hundred and forty eight degrees C. mixing the solution so formed with a filling material in the presence of furfural while maintaining the mixture at a temperature substantially within the range between ninety three degrees C. to one hundred and sixty one degrees C.

9. The process of producing a cold molding composition, which consists in forming a solution of a solid binding material insoluble in furfural, in a mineral solvent having a boiling point of from ninety three degrees C. to one hundred and forty eight degrees C. mixing the solution so formed with a filling material in the presence of approximately four and five tenths per cent of furfural calculated on the entire mass while maintaining the mixture at a temperature substantially within the range between ninety-three degrees C. to one hundred and sixty-one degrees C.

10. The process of producing a cold molding composition, which consists in forming a solution of a solid binding material insoluble in ethylene glycol, in a mineral solvent having a boiling range of between one hundred and fifty degrees C. and one hundred and seventy five degrees C., mixing the solution so formed with a filling material in the presence of ethylene glycol.

11. The process of producing a cold molding composition, which consists in forming a solution of a solid binding material insoluble in mineral solvent having a boiling range of one hundred and seventy degrees C. to five hundred degrees C., in methanol, mixing the solution so formed with a filling material in the presence of mineral solvent having a boiling range of one hundred and seventy degrees C. to five hundred degrees C.

12. The process of producing cold molding compositions which consists in forming a solution in alcohol, of a solid binding material insoluble in mineral solvent, mixing the solution so formed with a filling material in the presence of mineral solvent having a boiling point higher than the boiling point of said alcohol and being insoluble and immiscible in said alcohol.

13. The process of producing cold molding compositions which consists in forming a solution of a suitable binding material insoluble in furfural, in a mineral solvent having a boiling point below the boiling point of furfural and mixing the solution so formed with a filling material in the presence of furfural.

CLARENCE A. HERBST.